Feb. 27, 1951  R. M. WALKER  2,543,650
SIMULTANEOUS LINEAR EQUATION SOLVER
Filed March 4, 1949  7 Sheets-Sheet 1

INVENTOR
ROBERT M. WALKER
BY
Van Deventer & Shively
ATTORNEYS

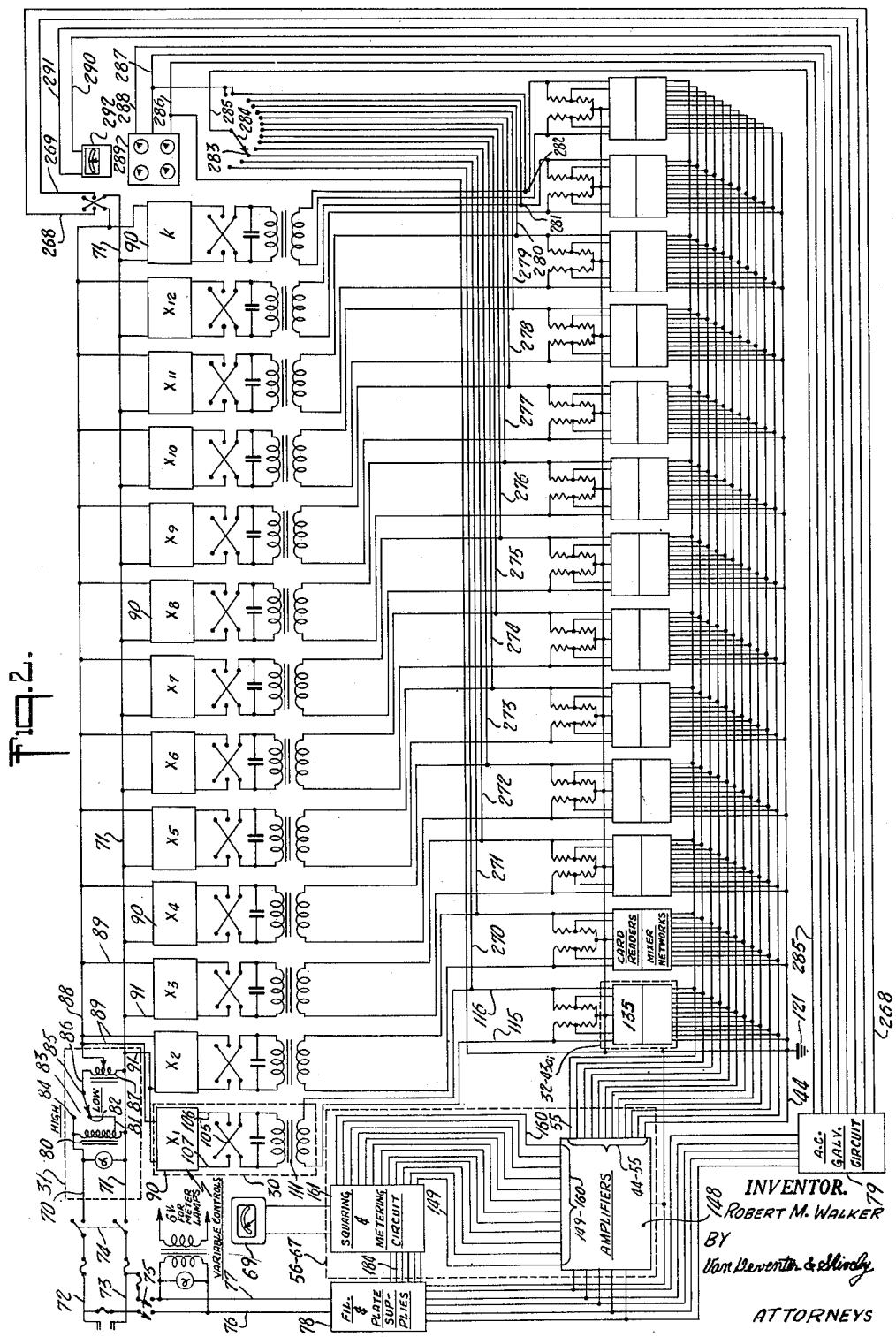

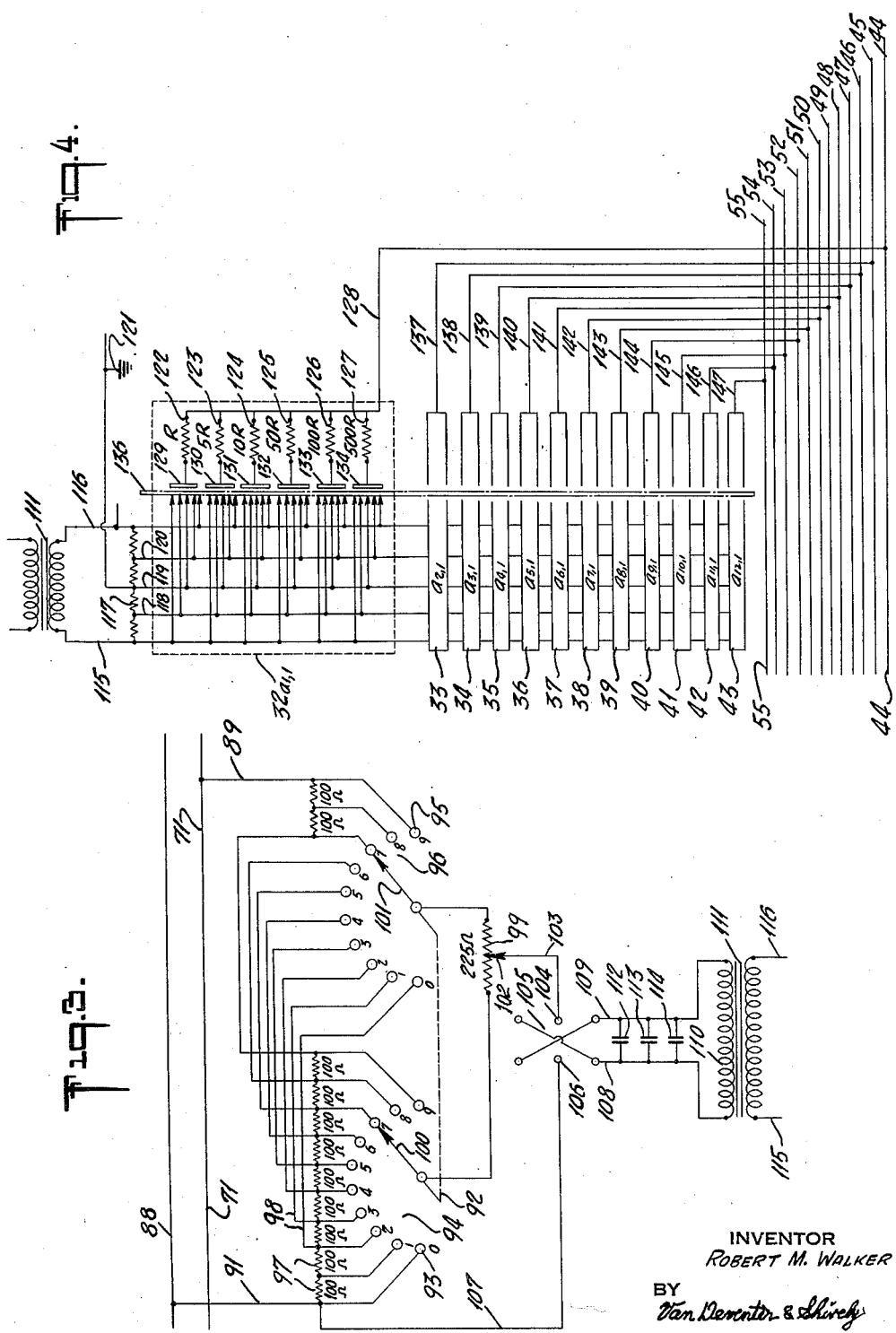

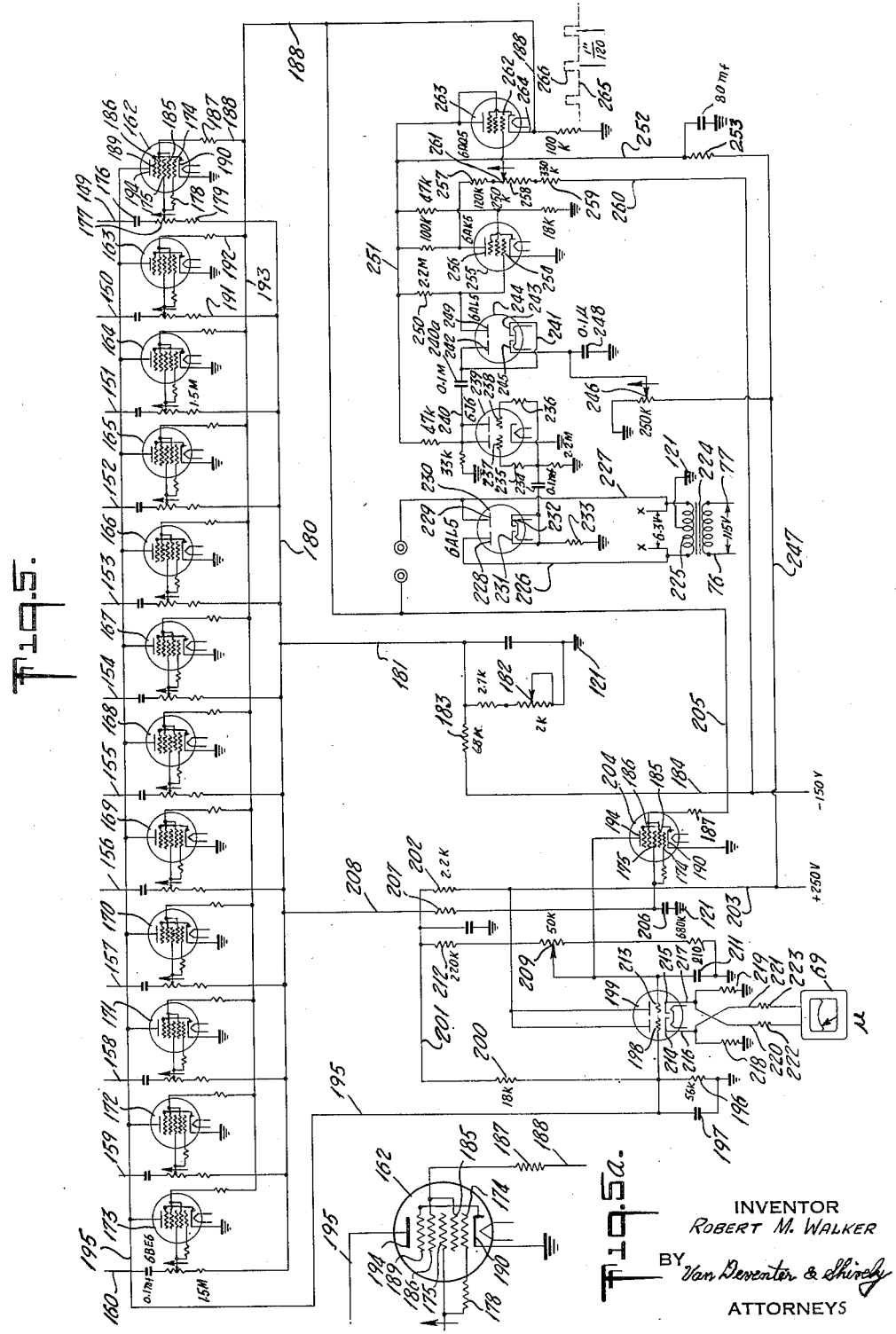

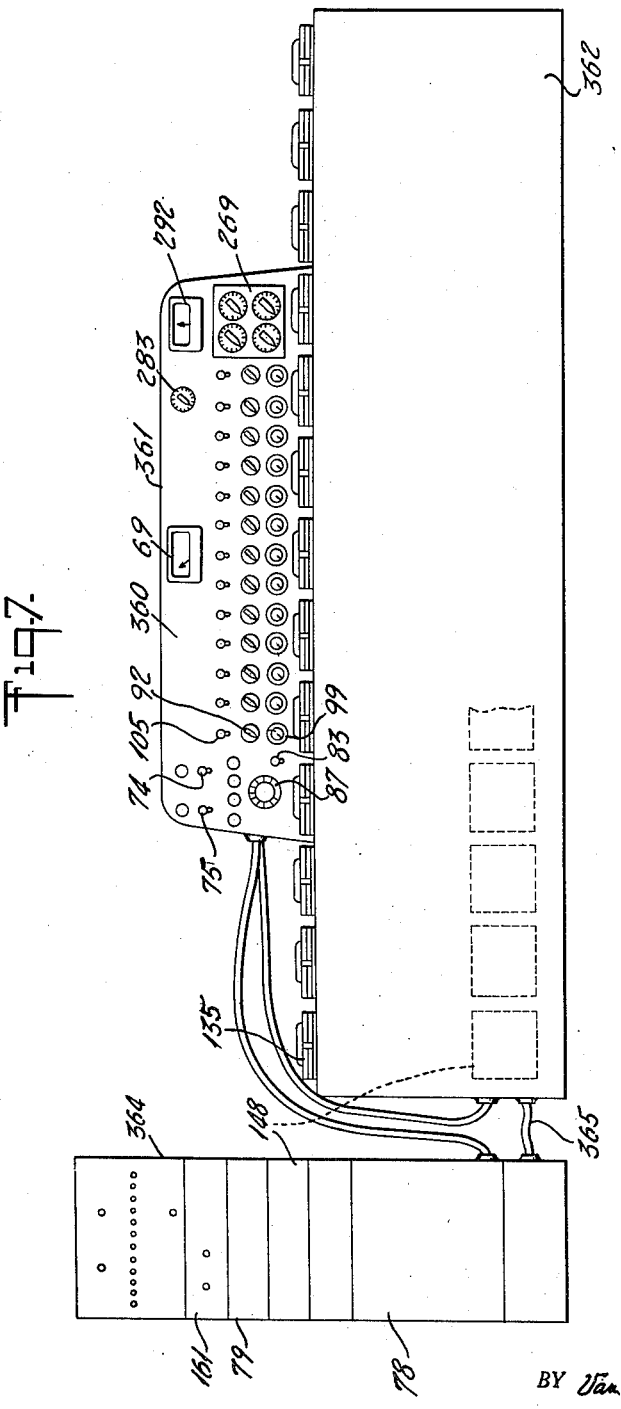

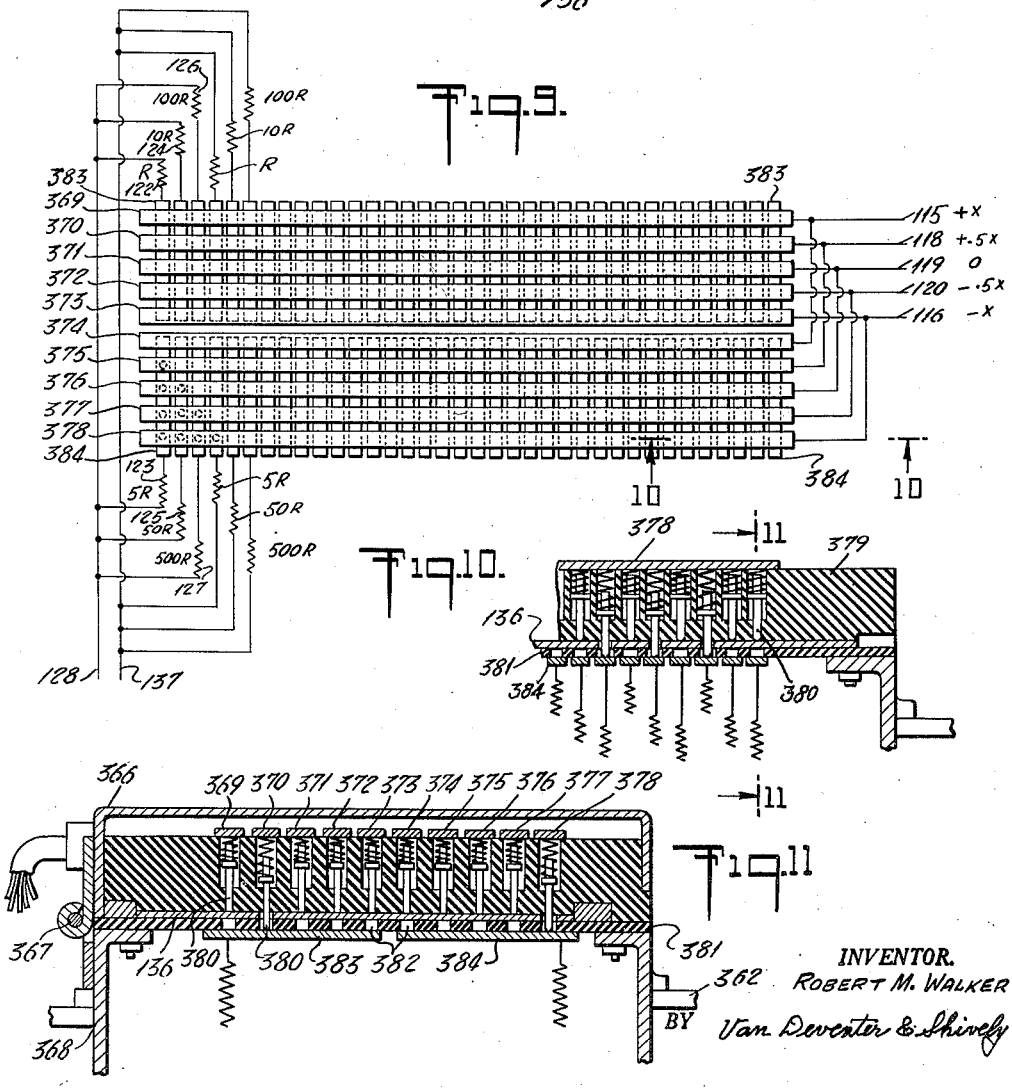

Patented Feb. 27, 1951

2,543,650

UNITED STATES PATENT OFFICE 2,543,650

SIMULTANEOUS LINEAR EQUATION SOLVER

Robert M. Walker, West Hempstead, N. Y., assignor to International Business Machines Corporation, a corporation of New York Application March 4, 1949, Serial No. 79,576

22 Claims. (Cl. 235—61)

The present invention pertains to improvements in mathematical apparatus and methods.

In co-pending application Serial No. 21,215, filed on April 15, 1948, now Patent Number 2,515,888, are described and claimed methods and apparatus for solving simultaneous linear equations by combining arbitrary electrical factors representative of the various unknowns and their known coefficients in such a manner as to produce a single indication representative of the sum of the squares of the errors in all the equations produced by initially wrong entries of the unknown factors, then varying the unknown factor entries to minimize or eliminate the error indication, whereby the final unknown factor entries determine the solution of the problem.

An object of the present invention is to provide improved electronic methods and apparatus for deriving electrical values representative of the squares of the errors in the equations, including the use of pentagrid tubes connected in circuits adapted to produce a high percentage of the output distortion characteristic proportional to the squares of the inputs.

Another object is to provide a method and means for applying phase-sensitive gating to the squaring circuits whereby variations due to phase-shifting may be rendered so small as to be negligible, thereby permitting the advantageous use of alternating current without the loss of accuracy.

A further object is to provide a method of digitally calibrating the solutional values of the unknown factors by means including an alternating current galvanometer circuit.

A still further object is to provide apparatus for carrying out the above methods in which entry of the known coefficients may readily be made by means of punched cards or the like.

Other objects and advantages of the invention will become apparent during the course of the following description in connection with the accompanying drawings, in which:

Figure 2 is a schematic wiring diagram showing the electrical connections between the various operational units of the device;

Figure 3 is a schematic wiring diagram of a control combination typical of those provided for entering values proportional to the X factors or unknowns of the equations;

Figure 4 is a typical electrical diagram of the resistor combinations selectively operable by means of punched cards for entering the coefficients of the variables;

Figure 5 illustrates the squaring tubes and their circuits including the meter adapted to provide an indication proportional to the sum of the squares of the equational errors, together with the means to provide phase-sensitive gating voltage to the squaring circuits;

Figure 5a is an enlarged detail diagram of one of the pentagrid squaring tubes and its connections, Fig. 5;

Figure 7 is a front elevation of a preferred form of the apparatus;

Figure 8 shows a typical punched card for use in entering various coefficients;

Figure 9 is a skeleton plan view of the card reader bus and contact bars;

Figure 10 is a fragmental sectional view showing the card controlled contact making means; and Figure 11 is a fragmental view of the same in transverse vertical section.

Figure 1:
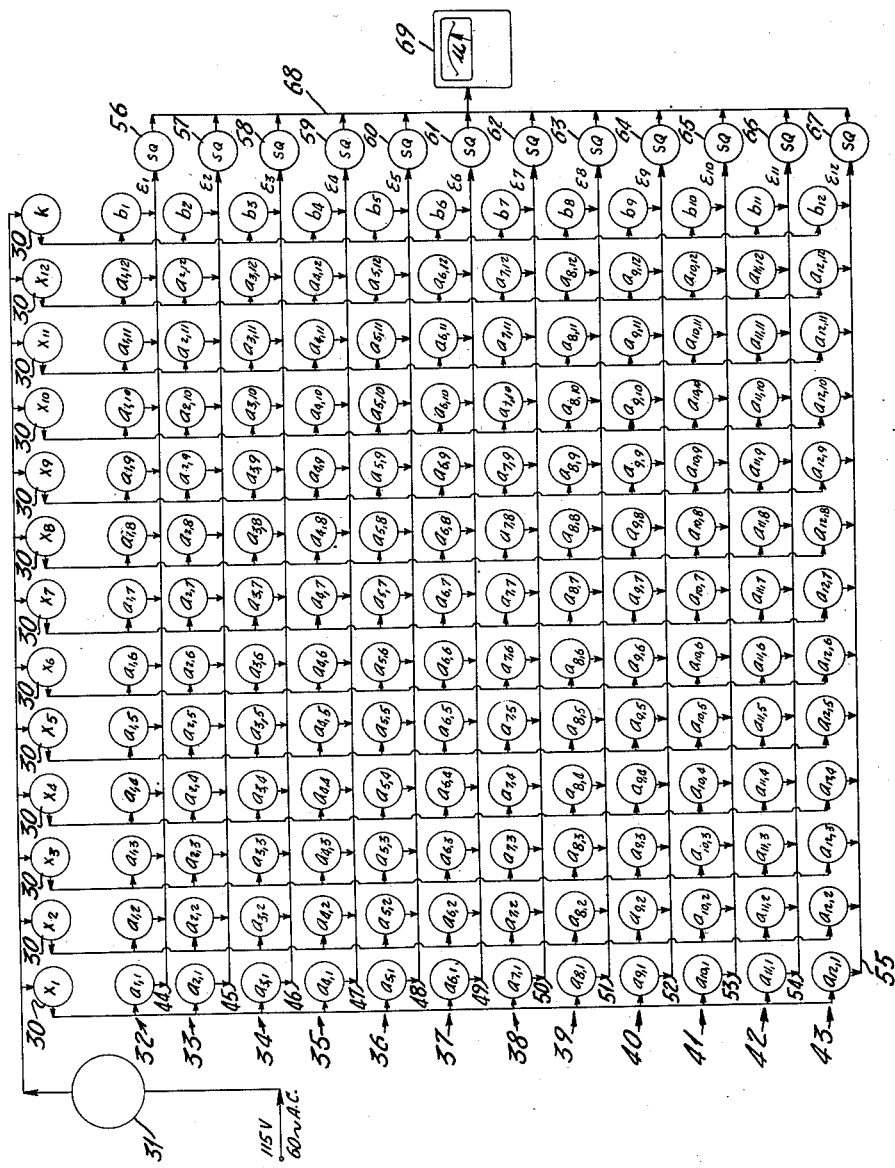
Figure 1 is a schematic functional diagram of a form of the device suitable for the solution of 12 equations of 12 variables.

The simplest case of simultaneous linear equations is that of two equations with two unknowns, for example:

$$a_{1,1}X_1 + a_{1,2}X_2 + b_1 = 0$$
$$a_{2,1}X_1 + a_{2,2}X_2 + b_2 = 0$$

The solution of such a case by well-known methods is comparatively simple. However, in more complex problems the complication and work of applying such methods increases rapidly with the number of unknowns involved. The general case with $n$ unknowns may be represented by writing the $i$th equation of the set of equations as follows:

$$\sum_{j=1}^{j=n} a_{ij}X_j + b_i = 0 \qquad (1)$$

The device of the present invention may be constructed with provision for readily solving problems having any desired number of variables and equations by electrical analogy, but for purposes of specific example the apparatus is herein described as adapted to solutions involving sets of up to twelve equations, that is, where $$n \leq 12$$

To set up the electrical analog for 12 equations requires 12 variables ($X_j$), twelve coefficients of each variable (making 144 of the $a_{ij}$ coefficients) and 12 constant terms $b_i$.

Referring to the functional diagram, Figure 1, the progress of the electrical analogy may be traced as follows:

Entries proportional to the 12 variables are made in the form of the outputs of 12 manually variable voltage sources. Since all these sources are identical in structure, to avoid undue multiplicity of index numbers the sources will all be identified by the numeral 30 preceded in the text by the designation of the corresponding variable, for example the $X_1$ source 30, the $X_2$ source 30, etc. All the variable voltage sources 30 are fed from a common supply source 31 which is in itself adjustable as hereinafter set forth. The signs of the individual variables are manually settable by means also hereinafter described in connection with Figures 2 and 3.

The output of each source 30 is fed in parallel to 12 decimally settable voltage dividers. Again, to avoid undue multiplicity of index numbers, all dividers of each horizontal row in Figure 1 will be designated by a single row number preceded by the designation of the corresponding coefficient, the horizontal numbers being 32, 33, 34, 35, 36, 37, 38, 39, 40, 41, 42 and 43. For example, the row 32 comprises $a_{1,1}$ divider 32, $a_{1,2}$ divider 32 etc. The output of the $X_1$ source 30 feeds the dividers $a_{1,1}$ 32, $a_{2,1}$ 33, $a_{3,1}$ 34 . . . $a_{12,12}$ 43 in parallel as noted. Thus, assuming the output potential of the $X_1$ source 30 to be represented as $x_1$, the output from $a_{1,1}$ divider 32 is proportional to $a_{1,1}x_1$, the output from $a_{2,1}$ divider 33 to $a_{2,1}x_1$, the output from $a_{3,1}$ divider 34 to $a_{3,1}x_1$, etc. Similarly, the outputs of the dividers connected in parallel to $X_2$ source 30 are proportional to $a_{1,2}x_2$ . . . $a_{12,2}x_2$, the same relationships existing between the outputs of the other sources 30 and the outputs of their connected dividers. Each of the horizontal rows 32 to 43 contains a 13th voltage divider identical in structure with those mentioned, these 12 additional dividers $b_1$ 32 . . . $b_{12}$ 43 being all fed from a 13th variable voltage source $k$30. Assuming the voltage output of the source $k$30 to be represented as $k$, the outputs of the dividers $b_1$ 32 . . . $b_{12}$ 43 are representative of $b_1k$ . . . $b_{12}k$ respectively.

The output potentials of all the voltage dividers 32 are added in a resistive network made up of the dividers themselves, as hereinafter explained in connection with Figure 4, the result being impressed on a common conductor 44 which consequently carries a potential representative of $$\epsilon_1 = \sum_{j=1}^{12} a_{1j}x_j + b_1k \quad (2)$$

Similarly, the respectively added output potentials of the other equational coefficient rows 33 . . . 43 are impressed on conductors 45 . . . 55, the general expression for the potential of any conductor in the series being $$\epsilon_i = \sum_{j=1}^{12} a_{ij}x_j + b_ik \quad (3)$$

It will be noted that the right half of the above expression differs in form from the fundamental set of Equations 1 due to the voltage factor $k$ and the presence of $x_j$ instead of $X_j$. The reason for the change is as follows:

Since there is necessarily a practical limit to the range of available voltage variation in any machine, a transformation of the unknowns of the original equations is necessary in order that this limited range can accommodate any required range of the unknowns. This is accomplished by designating the machine variable $x_j$, which is related to $X_j$ by a factor such that $$X_j = \frac{X_j}{K}, \text{ where } k \leq 1, x_j^2 \leq 1 \quad (4)$$

Substituting this in the fundamental set of Equations 1 gives $$\sum_{j=1_1}^{j=n} a_{ij}x_j + b_ik = 0 \quad (5)$$

It will be seen that $k$ corresponds to the voltage source for the constant terms, and by making it adjustable it becomes a controllable scale factor for the unknowns. In other words the solutional values $X_j$ of the original equations are not represented by the absolute outputs $x_j$ of the sources 30, but by the ratio $x_j/k$, so that $X_j$ may have any required values however large or small, while $x_j$ and $k$ are confined to the limited practical range capacity of the machine.

Since the coefficient entering means are voltage dividers, all values of $a_{ij}$ and $b_i$ must lie within the range from $-.999$ to $+.999$. For this reason, if in the original preparation of the problem any equation contains a coefficient or constant outside this range, the equation may be multiplied by a suitable constant so that the largest $a_{ij}$ or $b_i$ has an absolute value of less than unity.

In Equation 3, if all values of $x_j$ are correct, it is evident that Equations 3 and 5 become identical for the present case, that is:

$$\epsilon_i = 0$$

Conversely, if $\epsilon_i = 0$, all values of $x_j$ must be correct, thus setting up the requirements for the derivation of the solutional values of $X_j$ in the original problem by means of the ratio $$X_j = \frac{x_j}{k} \quad (4)$$

In dealing with a problem, obviously one cannot start with the solution, so that in general the equational potentials $\epsilon_i$ have real magnitudes, either negative or positive, due to the deviation in the entries of $x_j$ from the correct or solutional values. The values $\epsilon_i$ may therefore be referred to as error factors, and the solution of the problem is dependent on so varying the $x_j$ entries that all error factors $\epsilon_i$ become equal to or indistinguishable from zero.

It is an obvious mathematical principle that for real values, if the sum of the squares of a series of factors is zero, each factor in the series must be zero, that is in the present case:

$$\text{if } \sum_{i=1}^{12} \epsilon_i^2 \cong 0, \text{ then } \epsilon_i \cong 0$$

To achieve a single electrical value proportional to the above sum of the squares, the various equational potentials are individually impressed on a set of 12 electronic combinations 56 . . . 67 adapted to furnish outputs proportional to the squares of their inputs in a manner hereinafter explained in detail. The outputs of the combinations 56 . . . 67 are added in a common conductor 68 and an indication proportional to the resulting sum is given by a meter 69. Thus the indication of meter 69 represents the relation $$\mu = \sum_{i=1}^{12} \epsilon_i^2 \quad (6)$$

By a mathematical proof which has been fully set forth in the previously mentioned application, Serial Number 21,215 and which therefore need not be repeated herein, it has been shown that if one sets up the quantity $$\mu = \sum_{i=1}^{i=n} \epsilon_i^2$$

and adjusts the equational variables in a cyclic manner to reduce or minimize the quantity $\mu$, that $\mu$ converges toward zero which when reached, indicates that the $\epsilon_i$ values are all zero and that the final $x_j$ entries are correct. This procedure is followed by successively changing the settings of the variable sources 30, in each case until the indication $\mu$ is minimized, then when the meter indicates $\mu \cong 0$, the final potentials $x_j$ and $k$ are calibrated in a manner hereinafter explained in detail, and the solutional values of the unknowns derived by Equation 4 as previously set forth.

Since for Equation 4, $$k = \frac{|x_j|}{|X_j|}, \text{ and as } |x_j| \leq 1$$

then $$k \leq \frac{1}{|X_j|}$$

In the foregoing process of minimizing $\mu$ it may be found that with a given setting of $k$ some one of the $x_j$ values would have to be beyond the capacity of its variable source in order to maintain the above relationship. In this case the setting of $k$ is reduced to bring the necessary $x_j$ setting within the available range.

In the course of the following detailed description it will be seen that the main supply source 31 is adapted to furnish potential in different ranges, allowing the use of a low starting voltage to avoid overloads in the apparatus due to large initial errors, but permitting increased voltage to be applied as the solution progresses, to increase the proportional response of the meter 69 to changes in $x_j$, thus providing for fine adjustment.

Referring to Figure 2, the main internal conductors 70 and 71 of the supply source 31 receive 60 cycle 115 volt current via external main conductors 72 and 73 and a double-pole switch 74. A second double-pole switch 75 also connects the external main conductors 72 and 73 to leads 76 and 77 adapted to furnish power to a filament and plate supply sub-assembly 78 and an A. C. galvanometer circuit 79, details of which will be explained in due course.

The conductors 70 and 71 furnish primary current to an auto-transformer 80, the latter having a tap 81 connected to one point 82 of a double throw single-pole switch 83. The second point 84 of the switch 83 is connected to the conductor 71. The common electrode 85 of the switch 83 is connected via a wire 86 to one terminal of a second auto-transformer 87, the latter's other terminal being connected to the conductor 71. The second auto-transformer 87 is of the variable type, its variable output lead 88 being connected via branches 89 to all of the variable controls 90 of the $x_j$ and $k$ sources 30 in parallel. The second input connections of the variable controls 90 are through parallel branches 91 from the conductor 71.

The connection of the output tap 81 into the auto-transformer 80 is such that the voltage between the tap and the line 71 is about one sixth of the full-line voltage between conductors 70 and 71. With the described wiring arrangement, by throwing the switch 83 to the contact point 84, the auto-transformer 80 may be bypassed to impress full line voltage across the conductors 86 and 71, while by throwing the switch to contact point 82 the latter conductors are furnished with one-sixth of full-line voltage. Thus the voltage between 86 and 71 may be given either a high or a low voltage value, and the whole or any desired fraction of either of the voltage values may be applied by the variable auto-transformer 87 as the common signal voltage to the variable $x_j$ and $k$ sources 30.

Since as previously stated, all the variable X and $k$ sources 30 are identical in structure, the schematic detail electrical structure of one of these sub-assemblies as shown in Figure 3 may be taken as typical. Referring to Figure 3, the numberal 92 generally denotes a rotary switch of the double-deck type, each deck having 10 contact points. The zero point 93 of one switch deck 94 is connected to the supply branch 91, while the branch 89 is connected to the number 9 point 95 of the second deck 96. Equal resistors 97, of 100 ohms each in the present example, are connected between all adjacent contact points of the deck 94, and between the numbers 7, 8 and 9 points of the second deck 96. A series of seven jumpers 98 connect the numbers 0 to 7 points of the deck 96 respectively with the second higher digit points of the deck 94.

A variable tap resistor 99 having a total resistance slightly greater than double that of each resistor 97, in the present case 225 ohms, is connected between the movable contact arms 100 and 101 of the decks 94 and 96. The movable electrode 102 of the resistor 99 is connected via a wire 103 to one central pole 104 of a reversing switch 105. The second central pole 126 of the switch 105 is connected via a wire 107 to the supply branch 91.

The switch 105 is adapted to transmit current via wires 108 and 109 to the primary winding 110 of a transformer 111, the latter being resonated by means of parallel condensers 112, 113 and 114. The secondary leads 115 and 116 of the transformer 111 are connected to one coefficient entering means or voltage divider $a_i$ in each of the equational rows 32 . . . 43, Figs. 1, 2 and 4.

The above described arrangement of the typical $x_j$ source permits the voltage $x_j$ delivered to the transformer 111 to be varied from zero to the full voltage of the supply branches 89 and 91, the rotary switch 92 providing a coarse adjustment by steps of .1, while fine adjustment is accomplished by means of the variable resistor 99. The transformer 111 is preferably of the step-down type, for example adapted to give a secondary voltage of about 5 volts with 115 volt primary. The secondary is proportionally adjustable with the primary voltage by operation of the switch 92 and variable resistor 99 as noted above.

Referring to Figure 4, the secondary leads 115 and 116 of the transformer 111 are bridged by a resistor 117 which is divided into four equal parts by means of three taps 118, 119 and 120. The $a_{1,1}$ voltage divider 32, shown in detail as typical of all the similar dividers in the device, contains six graded resistors 122, 123, 124, 125, 126 and 127, all connected to a common conductor 128 leading to the equational conductor 44, Figs. 1 and 2. Five-point selector switches 129, 130, 131, 132, 133 and 134 are adapted to connect the resistors 122 . . . 127 respectively to any one of the leads 115 and 116 or taps 118, 119 and 120 as shown.

The switches 129, 130, 131, 132, 133 and 134 preferably comprise parts of a punch-card reader 135, Fig. 2, described in essential mechanical detail hereafter, and operable by a previously prepared card 136 to set up the connections in any desired combination.

By the even division of the resistor 117 as described, whereby output voltage of the transformer 111 is divided into four equal parts balanced with respect to ground, it will be evident that if the instantaneous voltage of the lead 115 is assumed as positive $x_1$, the corresponding potentials of the taps 118, 119, 120 and the lead 116 are respectively $+.5x_1$, $0$, $-.5x_1$ and $-x_1$ respectively.

Denoting the resistance of the resistor 122 as R, the resistances of resistors 123, 124, 125, 126 and 127 are respectively $5R$, $10R$, $50R$, $100R$ and $500R$. If the input voltages to the above resistors are denoted respectively by $E_1$, $E_2$, $E_3$, $E_4$, $E_5$, and $E_6$, the total output voltage $E_L$ for a single network of the above description is $$E_L = \frac{(E_1 + .2E_2) + .1(E_3 + .2E_4) + .01(E_5 + .2E_6)}{K}$$

where $$K = 1.332 + \frac{R}{R_L}$$

As for each equational combination in the present embodiment twelve more similar voltage dividers feed in parallel to a common output conductor such as 44, $R_L$ actually equals $$\frac{R}{12}(1.332)$$

so that the constant $K = 13(1.322) \cong 17.3$.

Since the voltages $E_1$ to $E_6$ can each have any one of five discrete values ($x_1$, $.5x_1$, $0$, $-.5x_1$, or $-x_1$), it would be possible to have $5^6$ different potential combinations set up by the switches 129 to 134. However, for the first decimal digit of a coefficient only the 19 combinations of $E_1$ and $E_2$ are used which gives values $-.9x_1$ to $+.9x_1$. These combinations are:

| $E_1$ | $E_2$ | $E_1 + .2E_2$ |
| --- | --- | --- |
| $-x_1$ | $+.5x_1$ | $-.9x_1$ |
| $-x_1$ | $+x_1$ | $-.8x_1$ |
| $-.5x_1$ | $-x_1$ | $-.7x_1$ |
| $-.5x_1$ | $-.5x_1$ | $-.6x_1$ |
| $-.5x_1$ | $0$ | $-.5x_1$ |
| $-.5x_1$ | $+.5x_1$ | $-.4x_1$ |
| $-.5x_1$ | $+x_1$ | $-.3x_1$ |
| $0$ | $-x_1$ | $-.2x_1$ |
| $0$ | $-.5x_1$ | $-.1x_1$ |
| $0$ | $0$ | $0$ |
| $0$ | $+.5x_1$ | $+.1x_1$ |
| $0$ | $+x_1$ | $+.2x_1$ |
| $+.5x_1$ | $-x_1$ | $+.3x_1$ |
| $+.5x_1$ | $-.5x_1$ | $+.4x_1$ |
| $+.5x_1$ | $0$ | $+.5x_1$ |
| $+.5x_1$ | $+.5x_1$ | $+.6x_1$ |
| $+.5x_1$ | $+x_1$ | $+.7x_1$ |
| $+x_1$ | $-x_1$ | $+.8x_1$ |
| $+x_1$ | $-.5x_1$ | $+.9x_1$ |

The same combinations are used for the second decimal digit ($E_3$ and $E_4$) and for the third decimal digit ($E_5$ and $E_6$), with the restriction, however, that the second and third digits must have the same sign as the first digit. Thus 1998 combinations provide representation of values from $-.999x_1$ to $+.999x_1$ by steps of $.001x_1$.

By the above means the potential of the conductor 128 is representative of the unknown variable input $x_1$ multiplied by its coefficient $a_{1,1}$.

The transformer leads 115 and 116 and the taps 118, 119 and 120 also feed the remaining $a_{1,1}$ coefficient networks or voltage dividers 33 to 43, Figure 4, the resistor combinations therein being set by the same punch card 136. Thus a single punch card serves to enter the coefficients of $x_1$ in all twelve equations, the outputs being transmitted via conductors 128, 137, 138, 139, 140, 141, 142, 143, 144, 145, 146 and 147 to the respective equational conductors 44 ... 55. The coefficient entries of the other $x$ values and $k$ are similarly set, one card 136 being used for each value of $x_j$ and one for $k$, so that 13 punch cards 136 are used to enter all coefficients and constants. The outputs of all the voltage dividers feed to their respective equational conductors 44 ... 55 as shown diagrammatically in Figure 1 in the same manner explained in detail with respect to Figure 4, so that when all coefficients are entered and the representative potentials $x_j$ and $k$ applied, the conductors 44 ... 55 carry potentials, as previously set forth, proportional to $$\epsilon_i = \sum_{j=1}^{12} a_{ij} x_j + b_i k \qquad (3)$$

Referring again to Figure 2, the numeral 148 generally denotes a bank of twelve identical amplifiers, the separate inputs of which are fed by the equational conductors 44 ... 55. The amplifiers 148 are of a type adapted to operate without hum, with low phase shift, and to provide substantially the same linear amplification of approximately 3000. As suitable amplifiers having the above characteristics are well known in the art, and as the particular details of their structures are not per se an essential feature of present invention, further detail description thereof is unnecessary and is accordingly omitted in the interests of brevity.

The amplifiers 148 have individual output leads 149 ... 160 corresponding to the input conductors 44 ... 55, and as the various responses are linear and of uniform grain ratio as noted, the output potentials retain the proportion given in Equation 3.

The amplifier output leads 149 ... 160, Fig. 2, feed into a squaring and metering circuit combination 161, shown in detail in Figure 5. The squaring elements of the combination 161 consist of twelve tubes 162 ... 173 of the pentagrid type generally termed converters, these tubes receiving their control inputs from the leads 149 ... 160 respectively. Taking the tube 162 as typical, control voltage from the lead 149 is impressed on both the number one grid 174 and the number three grid 175 through a condenser 176 and the upper resistance portion of a potentiometer 177, a resistor 178 also being connected in series with the number one grid 174. Grid bias is provided via a resistor 179 and wires 180 and 181, the latter being connected through an adjustable resistor 182 to ground and through a fixed resistor 183 to a $-150$ volt lead 184 of the power supply assembly 78, Fig. 2. The number two grid 185 and the number four grid 186 are connected through a common resistor 187 to a conductor 188 carrying a gating voltage, the nature and purpose of which will be set forth hereinafter. The number five or suppressor grid 189 is connected in the usual manner to the cathode 190, the latter being grounded.

The remaining equational tubes 163 ... 173 have connections identical with those described, all control grids 174 and 175 having connections either directly or through branches 191 to the common bias voltage conductor 180, while all screen grids 185 and 186 have connections through branches 192 to a bus wire 193 which is in turn connected to the common gating voltage conductor 188. The potentiometers 177 permit matching of the squaring tubes in the initial assembly or upon installation of new tubes. All cathodes are grounded as shown. The plates 194 of all tubes 162 ... 163 are connected to a common output bus 195 having a D. C. path to ground 121 through a resistor 196 and an A. C. path to ground via a suitable by-pass condenser 197.

The voltage of the output bus 195 is impressed on one grid 198 of a double triode tube 199. Plate circuit supply is furnished to the bus 195 via a resistor 200, a wire 201, and a second resistor 202 from the +250 volt output lead 203 of the power supply source 78.

A thirteenth pentagrid converter tube 204, identical with those described and hereinafter designated the reference tube, similarly has its screen grids 185 and 186 connected through a resistor 187 and a branch line 205 to the gating voltage conductor 188. The control grids 174 and 175 of the tube 204 have a connection through a condenser 206 to ground 121 and a second connection via a resistor 207 and wire 208 to the common bias voltage conductor 180.

The plate 194 of the reference tube 204 has a D. C. connection to ground through the lower resistance portion of a potentiometer 209 and a resistor 210, an A. C. path to ground being provided through a condenser 211. The upper terminal of the potentiometer 209 is connected through a resistor 212 to the plate supply conductor 201.

The output voltage of the reference tube 204 is impressed on the second grid 213 of the tube 199. The cathodes 214 and 215 are respectively connected via leads 216 and 217 and matched resistors 218 and 219 to ground. The microammeter 69, Figs. 1 and 2, is bridge between the leads 216 and 217 by conducting legs 220 and 221 including matched resistors 222 and 223. It will be seen that the above-described connections comprise a differential cathode follower circuit, the meter 69 being adapted to indicate differences in potential between the control grids 198 and 213.

The generating means for the previously mentioned gating voltages comprises the following:

The numeral 224 designates a filament transformer adapted to furnish 6.3 volt current to all heaters in the device. It will be understood that in the machine the transformer 224 is physically grouped with the power supply source 78, Fig. 2, but is included diagrammatically in Fig. 5 for purposes of clarity. The secondary winding 225 is center-tapped to ground 121. Branch leads 226 and 227 connect the secondary terminals respectively to the plates 228 and 229 of a double diode tube 230. The cathodes 231 and 232 of the tube 230 are connected to ground through a load resistor 233.

The tube 230 with its described connections constitutes a full-wave rectifier, producing a pulsating D. C. output of 120 cycles frequency. This wave is impressed via a condenser 234 and resistors 235 and 236 on the grids 237 and 238 of a twin triode tube 239 which is so arranged as to operate as a single triode. The tube 239 amplifies the pulsations of its input wave, the output comprising a wave with comparatively tall tapering peaks. A lead 240, a condenser 240a and a branch 241 impress this output of the tube 239 on the first plate 242 and the second cathode 243 of a second double diode 244. The first cathode 245 of the tube 244 is connected via a variable resistor 246 and a branch 247 to the +250 volt conductor 203, and also through a condenser 248 to ground. The second plate 249 is connected through a high resistance 250, conductors 251 and 252 and a suitable second resistor 253 to the +250 volt supply branch 247.

The output potential of the tube 244 is impressed on the control grid 254 of a pentode wave-squaring and amplifying tube 255. The latter's plate 256 has a connection through three resistors 257, 258 and 259, and a branch 260 to the −150 volt supply conductor 184. The resistor 258 has an adjustable tap 261 connected to the control grid 262 of a beam power tube 263, the latter having a cathode follower output connection 264 to the gating voltage conductor 188.

The double diode tube 244 receives the previously described 120 cycle pulsating wave from the twin triode 239, clips the peaks of the waves, and transmits the clipped wave form to the wave squaring tube 255 which amplifies and squares the waves. By means of the variable resistor 246 controlling the circuit of the cathode 245, the clipping level of the tube 244 may be adjusted. In the present case the level is adjusted to clip the waves comparatively low on their tapering peaks so that the remaining lower portions are of short time duration. As a result, the wave form when inverted, squared and amplified by the pentode 255, emerges in the general shape illustrated at 265, having a series of narrow rectangular waves 266 at 120 cycle frequency. The amplitude of the voltage waves 266 may be adjusted by means of the tap 261 which controls the input to the grid 262.

In describing the purpose and application of the gating voltage, it is necessary to examine the nature of the input voltages of the squaring tubes 162 ... 173. These tubes are biased to virtual cut-off, and the application of input signal to both their number one and number three grids 174 and 175 produces large output factors proportional to the squares of the inputs. The addition of suitable square components from all the squaring tubes is required for setting up a voltage accurately proportional to $$\mu = \sum_{i=1}^{12} \epsilon_i^2$$

However, this process is complicated by the fact that the electrical voltages representing the $x_j$ values are really complex, that is they are not in general exactly in phase with the voltage representing $k$, but may have relative phase angles $\theta_j$ of the order of $\pm 1°$. Therefore the alternating voltage output of the $i$th equation is:

$$\sum_{j=1}^{j=n} a_{ij} x_j \cos(\omega t + \theta_j) + b_i k \cos \omega t =$$
$$\left[ \sum_{j=1}^{j=n} a_{ij} x_j \cos \theta_j + b_i k \right] \cos \omega t -$$
$$\left[ \sum_{j=1}^{j=n} a_{ij} x_j \sin \theta_j \right] \sin \omega t \quad (7)$$

for values of $\theta_j$ between $-1°$ and $+1°$, $\cos \theta_j \cong 1$ within .02%. Therefore $$\epsilon_i = \sum_{j=1}^{j=n} a_{ij} x_j + b_i k \cong \sum_{j=1}^{j=n} a_{ij} x_j \cos \theta_j + b_i k$$

Thus it will be observed that $\epsilon_1$ closely approximates the coefficient of $\cos \omega t$ in Equation 7. A value representative of $\epsilon_1$ may therefore be set up directly by bringing $\cos \omega t$ to unity and eliminating the quadrature or sine factor. In the machine this is accomplished by periodically sampling the output voltage only at the times when $\cos \omega t \cong$ unity and $\sin \omega t \cong 0$, that is for a short period in each half cycle at the crests of the reference wave. It is to effect this momentary sampling that the previously described degating voltage is applied to the screen grids 185 and 186. By this means all the squaring tubes 162 ... 173 are gated to pass current only for the duration of the narrow rectangular screen voltage waves 266 at the crests of the reference wave as noted.

The characteristic output current of a tube of the type and connections described is of the form $$ip = \alpha E \cos \omega t + \frac{\beta}{2} E^2 + \frac{\beta}{2} E^2 \cos 2\omega t$$

It will be observed that the first term of the right side of the above equation represents a 60 cycle A. C. component, the middle term a D. C. component, and the third term a 120 cycle A. C. component. In the present embodiment of the invention the outputs of all the squaring tubes 162 ... 173 are collected in the common conductor 195. The A. C. components are bypassed to ground via the condenser 197, while the sum of the D. C. components is led to ground through the load resistor 196. Since as noted, the D. C. components are proportional to the squares of their respective inputs to the tubes 162 ... 173, it will be evident that the additional voltage drop across the resistor 196 produced by the combined D. C. components, and hence the rise in voltage of the grid 198 are proportional to the sum of the squares of the equational inputs, and thus proportional to $$\mu = \sum_{j=1}^{12} \epsilon_i^2$$

By prior adjustment of the resistor 209, the voltage of the second grid 213 of the tube 199 is balanced against the "no-signal" voltage of the grid 198 to bring the meter 69 to zero reading. When the above-described gated signal voltage is impressed on the grid 198, the result is an unbalance of the described differential cathode follower circuit, causing a current to flow through the meter 69 which is proportional to the voltage rise of the grid 198, so that the meter 69 registers the desired indication proportional to $\mu$, that is proportional to the sum of the squares of the equational errors $\epsilon_i$.

As set forth previously, the presence of any $\mu$ reading other than zero indicates that one or more of the voltage entries representing $x_j$ must be incorrect. Accordingly, these entries are successively varied by means of their respective rotary switches 92, variable resistors 99, and if necessary the reversing switches 105, Fig. 3, to produce successive minimum readings of $\mu$. This process is continued until the reading of $\mu$ becomes zero, indicating that all values of $x_j$ voltages are correct.

The correctness of the final $x_j$ voltages having thus been established, the next step is to determine their relative magnitudes and that of the gage variable voltage $k$. This is accomplished by the following means and method:

Referring first to Figure 2, it will be seen that the main voltage supply conductors 71 and 88 may be connected through a reversing switch 267 to a pair of wires 268 and 269 leading to the AC galvanometer circuit combination 79. The output leads 116 of all the $x_j$ and $k$ voltage sources 30 are connected respectively by branch conductors 270 ... 282 to successive contact points of a rotary selector switch 283. The movable contacts member or arm 284 of the switch 283 is also connected to the circuit combination 79 via a wire 285. Three conductors 286, 287 and 288 electrically join the circuit combination 79 with a decade potentiometer 289. Similarly, wires 290 and 291 connect the combination 79 with a plus-and-minus reading D. C. micro-ammeter 292.

Figure 6:
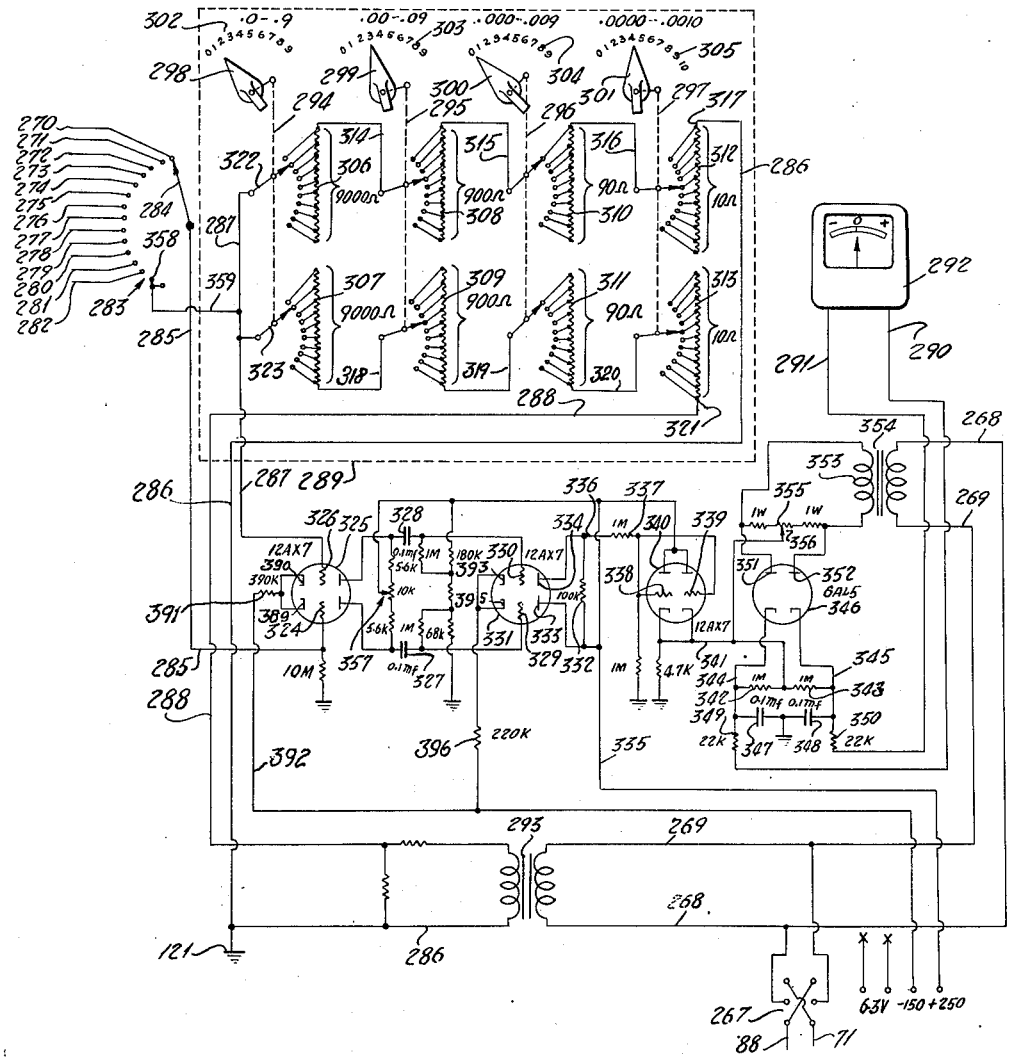
Figure 6 illustrates the circuit means by which the final relative solutional entries of the various unknowns are evaluated.

The apparatus listed in the foregoing paragraph forms a single functional unit, and while in the machine some of the elements are physically separated as indicated in Figure 2, for clarity in explanation they have been grouped in a single detail diagram, Figure 6.

Referring to Figure 6, the A. C. supply conductors 268 and 269 feed the primary winding of a transformer 293, the secondary connections being via the previously noted wires 286 and 288 to the decade potentiometer 289. The decade potentiometer comprises four double-decked step-by-step rheostats 294, 295, 296 and 297, provided with operating pointer knobs 298, 299, 300 and 301 cooperative with digital dials 302, 303, 304 and 305 respectively. The upper deck 306 and lower deck 307 of the rheostat 294 are each adapted to provide a resistance of 0 to 9000 ohms by nine steps of 1000 ohms each. Similarly the upper and lower decks 308 and 309 of the rheostat 295 each provide a resistance of 0 to 900 ohms by nine steps of 100 ohms each. Upper and lower decks 310 and 311 of rheostat 296 each provide resistances of 0 to 90 ohms by steps of 10 ohms each, while the upper and lower decks 312 and 313 of rheostat 297 are each adapted to provide resistances of 0 to 10 ohms by 10 steps of 1 ohm each.

The upper decks 306, 308, 310 and 312 are connected in series by means of wires 314, 315 and 316, while the zero terminal 317 of the deck 312 is connected to the A. C. conductor 286. Similarly the lower decks 307, 309, 311 and 313 are connected in series by wires 318, 319, and 320, but the second A. C. conductor 288 is connected to the number 10 terminal 321 of the deck 313. The upper and lower deck arms 322 and 323 of the rheostat 294 are both electrically joined to the conductor 287.

By the arrangement described and as shown in Figure 8, it will be evident that by selective settings of the dial knobs 298, 299, 300 and 301, any resistance from 0 to 10,000 ohms may be placed between the conductors 287 and 286, through the additive series connection of the upper rheostat decks 306, 308, 310 and 312. Similarly, the lower deck series is settable to place any resistance from 0 to 10,000 ohms between the conductors 288 and 287, but in reverse relation to the dial settings, that is, when an increment of resistance is added in an upper deck, the same amount is subtracted in the corresponding lower deck. As a result, no matter what value of resistance is placed between conductors 286 and 287, the total resistance between conductors 288 and 286 remains 10,000 ohms.

The conductor 287 is connected to ground 121. It is therefore evident that by setting the various rheostat knobs as noted, the voltage $V_s$ of the conductor 287 may be made any desired fraction of the voltage of the A. C. conductor 288 between zero and unity by digital setting to the fourth fractional decimal. For example, the combined reading of the dials 302 ... 305 as set in Fig. 6 shows the fraction representative of the voltage $V_s$ to be .1304.

The conductor 285 forms a connection between the arm 284 of the selector switch 283 and one grid 324 of a double triode tube 325. Thus any one of the $x_j$ and $k$ alternating voltages $V_x$ may be impressed on the grid 324. The second grid 326 of the tube 325 is connected to the conductor 287, and is thus adapted to receive the alternating potential $V_s$ established by the setting of the decade potentiometer 289 as described above. The cathodes 389 and 390 are connected through a high common resistance 391 to a −150 volt supply conductor 392. The output voltages of the tube 325 corresponding to $V_x$ input and $V_s$ input are impressed via condensers 327 and 328 respectively on the grids 329 and 330 of a second double triode 331. A resistor 332 is connected across the first and second plates 333 and 334, the plate 333 also being connected via a conductor 335 to the +250 volt plate supply. A lead 336 from the plate 334 carries the output of the tube. Cathodes 393 and 395 of the tube 331 are connected via a common high resistance 396 to the −150 volt conductor.

The output lead 336 of the tube 331 has a connection via a resistor 337 to both grids 338 and 339 of a third double triode 340 which is wired to operate as a single power amplifier, having a single cathode follower output conductor 341.

With the above arrangement, assuming that a difference exists between the initial input voltages $V_x$ and $V_s$, the output voltage in the lead 336 from the tube 331 and hence the grid voltage of the tube 340 and finally the latter's output through the lead 341, are all proportional to $V_x - V_s$.

The output conductor 341 is connected through balanced resistors 342 and 343 respectively with the cathode leads 344 and 345 of a double diode tube 346. The leads 344 and 345 are connected via condensers 347 and 348 to ground, and also through equal resistors 349 and 350 and conductors 290 and 291 to the micro-ammeter 292. Alternating input to the plates 351 and 352 of the tube 346 is supplied from the secondary winding 353 of a transformer 354, the plates 351 and 352 being bridged by a resistor 355 having an adjustable center tap 356 connected to the conductor 341. It will be seen that the described combination comprises a phase detector circuit. When the output voltage of the lead 341 is zero, that is, when $V_x = V_s$, no current flows in the circuit of the meter 292, which consequently indicates zero. The initial zero setting of the meter may be made with high precision by means of the adjusttable tap 356 of the resistor 355.

When $V_x \neq V_s$, the output pulsations of conductor 341 are added to the output pulsations from the side of the tube 346 with which they are substantially in phase and subtracted from those from the other side with which they are out of phase, unbalancing the voltage between the leads 344 and 345 so that a current flows through the meter 292. The effects of quadrature or sine components in the unbalancing voltages applied to the bridge are eliminated, since the sine components are 90° out of phase with the voltages of both leads 344 and 345 and hence are balanced out between them so as to have no effect on the meter current. Thus the meter current is proportional to $E_s \cos \theta_{sr}$, where $E_s$ is the unbalancing voltage and $\theta_{sr}$ is the phase angle between this voltage and the reference voltage. Since these voltages are substantially in phase, the meter current and hence the reading are proportional to $V_x - V_s$. The connections of the meter are such as to cause a plus reading when the absolute value of $V_s$ is greater than that of $V_x$ and a minus reading when the absolute value of $V_s$ is less than that of $V_x$.

While the various resistors employed throughout the described calibrating combination are pre-selected for a high degree of precision, a differential balance 357 is provided between the two plate circuits of the first double triode 325 to allow compensation for any possible small inaccuracies in resistance values. The phase detector circuit having been balanced at zero signal to set the zero reading of the meter 292 as previously described, the selector switch 283 is turned to a 14th contact point 358 which is connected through a branch 359 with the $V_s$ conductor 287. By this means both grids of the tube 325 are adapted to receive the same voltage $V_s$. The decade potentiometer 289 and the main supply voltage controls are then set to give a maximum value of $V_s$, and the balance 357 is adjusted to eliminate any deviation of the reading of the meter 292 from the zero point, thus establishing the initial balance of the apparatus.

In the solution of the problem, the correctness of the final $x_j$ voltages having been established by reduction of the $\mu$ reading of the meter 69 to zero as previously described, digital expressions representative of the relative magnitudes of $x_j$ and $k$ are successively established by the calibrating A. C. galvanometer combination as follows, taking first as example the $x_1$ voltage.

By means of the selector switch 283, the $x_1$ voltage $V_x$ is impressed on the grid 24 of the tube 325, Figure 8. The decade potentiometer 289 is then adjusted until the voltage $V_s$ supplied therethrough to the grid 326 brings the A. C. galvanometer system into balance, that is until a null indication appears on the meter 292. Rapid attainment of this adjustment is facilitated by the fact that prior to balance the plus or minus directional indication of the meter 292 shows at once whether $V_s$ is smaller or greater than $V_x$.

Balance having been established, the combined digital setting of the decade potentiometer 289, representative of the magnitude of $V_s$ as previously noted, is also representative of the magnitude of $V_x$, since for null reading $V_x = V_s$. By this means an expression representative of $x_1$ is established through the fourth decimal fractional digit.

In the same manner, by successive settings of the selector switch 283 and repetition of the described balancing procedure, expressions representative of the relative magnitude of all the $x_1$ and $k$ values are established. From these expressions at the absolute solutional values of the unknowns are derived directly by the previously noted relation $$X_j = \frac{x_j}{k} \qquad (4)$$

Since the $x$ and $k$ expressions may have any fractional values, and $X$ is the ratio between them, it is evident that the $X_j$, the absolute solutional values of the problem, may have any magnitudes, however large or small, independently of any physical limitations and capacity of the machine.

When during the course of minimizing $\mu$ it has been found necessary to change the sign of an $x_j$ entry from plus to minus by means of a reversing switch 105, Figs. 1 and 3, thus indicating that the solutional value of $x$ is negative, the reversing switch 287 is also thrown to minus position when calibrating that particular $x_j$ value, in order to keep the voltages $V_s$ and $V_x$ in phase.

Figure 7 shows the exterior arrangement of a typical form of the invention. The front panel 360 of a control cabinet 361 carries the power and signal switches 75 and 74, the high and low signal voltage switch 83, the adjustable autotransformer 87, the coarse and fine adjusting means 92 and 102 for entering the $x_j$ and $k$ voltages, the $x_j$ and $k$ reversing switches 105, the $\mu$ meter 69, the reversing switch 267, the calibrating decade potentiometer 289, and the calibrating micro-ammeter 292.

The various voltage dividers 32 . . . 43 for entering coefficients are disposed in a lower housing 362, the upper portions of these divider units comprising hinged punch-card readers 135, the general structure and operation of which will be explained in connection with Figures 8, 9, 10 and 11.

A casing 364 comprises the housings of the squaring and metering combination 161, the last stages of the amplifiers 148, the galvanometer circuit sub-assembly 79 and the filament and plate supply combination 78. The control cabinet 361, the housing 362 and the casing 364, together with their respective apparatus, may be conveniently constructed as separate units interconnected by suitable cables such as 365, Fig. 7. With this construction the first two stages of the amplifiers 148 are located in the housing 362 in order to effect part of the amplification before transmission through the cable 365.

The thirteen card readers 135 are of identical construction, the typical structure comprising a lid portion 366, Figure 11, hinged at 367 to a casing 368 depending in the lower housing 362. Ten longitudinal metallic bars 369, 370, 371, 372, 373, 374, 375, 376, 377 and 378 are secured on the top of an insulating block 379 in the lid 366. A row of 36 spring-pressed contact pins 380 underlies each of the bars 369 . . . 378, the pins in each row being electrically connected to their respective bar. An insulating plate 381, secured to the casing 368, has perforations 382 aligned with the pins 380.

Two rows of 36 transverse metallic bars 383 and 384 are secured to the bottom of the plate 381 under the perforations 382, each bar 383 or 384 underlying five pins 380 in transverse alignment. It will thus be seen that when a properly punched card 136 is aligned on the plate 381 and the lid 366 is closed thereon, each transverse bar 383 may be electrically connected by a pin 380 with any one of the longitudinal bars 369, 370, 371, 372 or 373, depending on the location of the perforation in the card, while each transverse bar 384 may similarly be connected with any one of bars 374, 375, 376, 377 or 378.

The longitudinal bars 369 and 374 are both electrically connected to the secondary variable entry lead 115, Fig. 4; bars 369 and 375 are similarly connected to the tap 118; bars 370 and 376 are connected to the center tap 119; bars 371 and 377 are connected to the tap 120; and bars 373 and 378 are electrically joined to the second secondary variable entry lead 116, as illustrated in Figure 9. The first three transverse bars 383 are connected respectively through the resistors 122, 124, and 126 to the common conductor 128, and the first three bars 384 are similarly joined via the resistors 123, 125 and 127 to the conductor 128. It will be seen that the above mentioned six transverse bars, together with the cooperative longitudinal bars and pins, comprise the mechanical embodiment of the switches 129, 130, 131, 132, 133 and 134, Figure 4, and are thus adapted to set up parallel resistor combinations representative of the coefficient $a_{1,1}$ in any desired three fractional digit combination, as previously set forth.

In the same manner, the second group comprising three each of bars 383 and 384 have resistor connections identical with the described $a_{1,1}$ group and are cooperative with the transverse bars and pins 380 under control of the card 136 to establish a three-digit entry representative of $a_{2,1}$. Similarly, the remaining ten groups of six transverse bars are cooperative with the longitudinal bars, pins 380 and card 136 to effect respective entries of $a_{3,1}$ to $a_{12,1}$. Thus by means of a single properly punched card 136, all the coefficients $a_i$ of $x_1$ may be entered, as mentioned in connection with diagrammatic Figure 4.

Figure 9 illustrates a typical card 136 having thirty-six vertical rows of ten punch positions each, each group of three vertical rows being adapted to control the three digits of a coefficient. The cards may be prepared on any suitable card punch such as the type disclosed in Patent Ser. No. 1,976,618, the punch being preferably wired in the usual coding manner to punch the two perforations necessary to set up each digit at a single depression of a key.

The figures in the extreme right hand column on the card illustrate the means by which the various combinations of connections to two of the longitudinal reader bars are made to set up the desired values of each digit. Thus the (+5) and (0) perforations 385 and 386 set up the first digit .5, the (+5) and (+2) perforations 385 and 387 set up the second digit .07 and the (+5) and (+1) perforations 385 and 388 set up .006, the combination completing the $a_{1,1}$ coefficient .576.

In setting up the machine for solution of a problem, a card 136 is coded in the manner described for each of the thirteen sets of coefficients for $x_j$ and $k$, and these cards are placed in their respective readers 135, thus digitally entering all values of $x_j$ and $k$. If there are less than 12 unknowns, zeros are inserted as coefficients of all the missing elements.

The power switch 75 is closed to warm up the various tubes. The usual process is to start with the $k$ source 90 set at $k=1$ and all the $x_j$ sources 90 set at zero. The switch 83 and the auto-transformer 87 are set to low input positions, in order that the large errors during the initial stages of solution may not overload the subsequent amplifiers and the meter 69. The signal switch 74 is then closed and the error indication $\mu$ is observed on the meter 69.

The operator then varies the $x_j$ settings in cyclic succession as previously described to decrease the error reading. As the error reading becomes small the input voltage is increased by means of the variable auto-transformer 87 and switch 83 in order to increase effectively the scale sensitivity of the error indication, the $k$ entry also being varied if required for the purpose previously explained. The cyclic adjusting process is continued, the error indication $\mu$ moving toward zero and the $x_j$ values converging toward the solution. When $\mu \cong 0$ with high voltage input, the relative values of $x_j$ and $k$ are digitally determined by means of the selector switch 283, the decade potentiometer 289 and the X solutional values are derived by the relation $$X_i = \frac{x_j}{k}$$

as previously noted.

The use of punched cards for the insertion of problem data has various important advantages over the use of switches and potentiometers. For example, it allows the preparation of a new problem while the machine is in use for a previous problem, thorough checking of the data by duplicate punching and comparison, easy permutation of coefficient units as a machine check procedure, and filing of problems for subsequent reinsertion.

Due to the inherent accuracy of the digital coefficient entry means and digital read-out means, the initial solution by the method described is derived with a high degree of practical accuracy. If, however, the conditions of the problem are such as to require super-precision, eliminating the effects of any possible observational inaccuracies or the like, a numerical check may be made by substituting the derived values in the original equations. If the process indicates any significant errors, a new set of equations may be set up in which the $X_j$s are the errors in the original solution, and these $X_j$ errors themselves determined by solution in the machine in the manner described. This iteration process requires the punching of only one new card, namely that required for the new coefficients of $k$, the $x_j$ coefficients remaining as before.

It will be evident that the iteration process may be repeated as often as required to carry the solution to any degree of precision desired.

In addition to providing rapid and accurate actual solution of problems, the analog device as described presents related advantages. For example, it indicates the relative effect of the various unknowns on the sum of the squares of the equational errors, thus giving a measure of the relative critical importance of the corresponding factors in the original process for which the equations were set up. Similarly, it allows investigation of the effect of varying one or more of the coefficients without requiring a complete new solution.

The use of alternating current in the preferred form of the invention has various advantages, such as the ease of obtaining a large amplification of the equational errors, the possibility of using transformers to go from unbalanced attenuators to balanced loads, the ready availability of commercial current of suitable frequency, etc. Full use of these advantages is made possible by the elimination of the effects of the principal error-producing characteristic of A. C. current, namely the tendency toward phase-shifting.

Throughout the description of the apparatus the exact values of the various resistances and capacities embodied in the electronic circuits have not been listed in the text; significant values thereof being shown on the drawings. It will be understood that these values are given as illustrating a properly operative combination, but that other combinations of these and other elements of the circuits may be substituted to perform the functions and method as set forth. In other words, while the invention has been described in preferred form, it is not limited to the exact structures illustrated, as various changes and modifications may be made without departing from the scope of the appended claims.

What is claimed is:

1. In a process including parallel amplification of a plurality of alternating current input voltages of equal frequency in electronic circuits and the summation of the outputs thereof, said input voltages each having a cosine component and a sine component, that method of minimizing the output effects of phase-shifting between said input voltages which comprises the steps of establishing said outputs in timed relation to said frequency as said cosine components approach maximum values and said sine components approach zero, maintaining said outputs during the successive subsequent time intervals wherein said cosine components are substantially at maximum values and said sine components substantially at zero and interrupting said outputs at the ends of said time intervals, whereby said outputs may be limited to said time intervals.

2. A method as claimed in claim 1 including the step of generating a gating voltage having substantially rectangular wave-form of twice the frequency of said input voltages, wherein said establishing step includes applying said gating voltage to said amplifying circuits in enabling relationship, and wherein said interrupting step includes withdrawing said enabling voltage from said circuits.

3. In a device for solving simultaneous linear equations having unknown variables and known coefficients thereof, a source of alternating current, a plurality of transformers connected to said source and equal in number to the maximum number of said unknown variables plus one gage variable, means to individually vary the output voltages of said transformers whereby said output voltages may be proportionally representative of values of said unknown variables and said gage variable, an equational output conductor for each of said equations, voltage dividers connecting each of said transformers with all said equational conductors, said dividers being digitally settable to transmit fractional portions of said transformer output voltages proportionally representative of said unknowns and said gage variable multiplied by the respective coefficients thereof to produce a composite equational potential in each of said equational conductors, parallel amplifiers adapted to amplify said equational potentials in equal proportion, a multigrid electronic tube associated with each of said parallel amplifiers, means to energize said tubes, means to apply said amplified equational potentials to a preselected plurality of said grids in each of said respective tubes, whereby said tubes may establish currents proportional to the squares of said equational potentials, means to add said current, means to measure said current sum, means to set up reference voltages, and digitally settable calibrating means to equate values of said reference voltages successively to said transformer output voltages, whereby relative digital values of said unknowns and said gage variable may be established.

4. A device as claimed in claim 3 wherein said voltage dividers include sets of graded fixed resistors and a plurality of switching means controllable by punched cards to selectively place said resistors in pre-determined circuit combinations representative of said coefficients.

5. A device as claimed in claim 3 wherein said voltage dividers include sets of graded fixed resistors and switching means controllable by punched cards to selectively place said resistors in pre-determined circuit combinations representative of said coefficients, those of said switching means associated with each of said transformers being grouped together, whereby the resistor circuit combinations representative of all the coefficients of each one of said variables may be set up under control of a single punched card.

6. A device as claimed in claim 3 wherein said tubes comprise pentagrid tubes, wherein the outputs of said parallel amplifiers are connected to the first and third grids of said respective pentagrid tubes, and wherein said current adding means includes a common output conductor connected to the plates of all said pentagrid tubes.

7. A device as claimed in claim 3 wherein said tubes comprise pentagrid tubes, wherein the outputs of said parallel amplifiers are connected to the first and third grids of said respective pentagrid tubes, said current adding means including a common output conductor connected to the plates of all said pentagrid tubes; means to generate a gating potential of narrow rectangular wave form having twice the frequency of said amplified equational potentials, and means to impress said gating potential on the second and fourth grids of all said pentagrid tubes whereby said tubes may be intermittently actuated in timed relation to the fluctuations of said amplified equational potentials.

8. A device as claimed in claim 3, wherein said means for measuring said current sum comprises electronic means adapted to produce a correcting output potential, means forming a differential cathode follower circuit controllable jointly by the potential of said current sum and said correcting potential, and a meter bridged across said differential circuit, said electronic correcting potential producing means being adjustable to vary said correcting potential whereby said differential circuit may be balanced to bring said meter to accurate zero indication when said current sum is zero.

9. In an electrical analog device for solving simultaneous linear equations having variable unknown factors and known coefficients thereof, and constant terms, in combination, a plurality of similar groups of graded fixed resistors, said groups being at least equal in number to the number of said coefficients and said constant terms, switching means operable by punched cards to associate pre-selected resistors within each of said groups in respective correspondance with the values of said coefficients and constants, means operable through said groups of associated resistors to establish electrical potentials relatively proportional to the unknowns of said equations and to a gage variable associated with said constant terms, a source of reference potential, and digitally settable calibrating means including a second plurality of graded fixed resistors selectively cooperative to equate known relative values of said reference potential successively to said first-named potentials, whereby digital relative values of said gage variable and each of said unknowns may be established.

10. The combination claimed in claim 9 wherein said equating means includes a calibrated decade potentiometer adapted to set up trial values of said reference potential, electronic means forming two normally balanced parallel output circuits and including two control grids adapted to carry said unknown potential values coincidentally with said respective trial reference potential values for modulating said parallel output circuits, whereby direct electrical difference values may be established between said parallel output circuits proportional to the differences between said first named potentials and said trial reference values, and a direct current meter for measuring said difference electrical values, said meter being adapted to indicate which of each pair of said coincident modulating potential values is the greater.

11. The combination claimed in claim 9 wherein said first-named potentials and said reference potentials are of equal alternating frequency, and wherein said equating means includes a calibrated decade potentiometer adapted to set up trial values of said reference potential substantially in phase with said first-named potentials, electronic means including a phase-detector circuit to establish electrical values proportional to the differences between said first named potentials and said trial reference values, and a direct current meter operable by said circuit to measure said difference values and to indicate whether said first named potentials or said respective trial values are greater.

12. That method of solving simultaneous linear equations having unknown variables, known coefficients of said variables, and constant terms, which includes the steps of establishing initial electrical entry potential values representative of said equational variables and a gage variable, said variable potentials being of a predetermined alternating frequency, dividing said potentials in proportion to said respective coefficients and constants to produce output potentials representative of said equational variables modified by said respective coefficients and of said gage variable modified by said constants, combining said output potentials for each of said equations to produce a single potential for each equation proportional to the total error of said equation due to incorrectness of said initially established equational variable values, producing currents controlled by said equational error potentials and proportional to the squares thereof in successive separated time intervals in timed relation to said frequency, combining said currents to establish a single electrical value proportional to the sum of said squares, measuring said last named single electrical value to produce a quantitative error indication proportional to said sum of said squares, successively changing the magnitude of each of said equational variable entry potentials while keeping the others constant to produce final variable entry potentials giving a minimum value of said total error indication, and equating each of said final variable entry potentials and said gage variable entry potential to known relative potential reference values, whereby known relative values of said equational variables and said gage variable may be established.

13. The method claimed in claim 12 wherein said intermittent current-producing step includes generating an enabling voltage during said successive time intervals corresponding to predetermined phase periods of said equational error potentials whereby the effect of phase-shifting between said equational error potentials on said single electrical value proportional to the sum of said squares may be minimized.

14. The method claimed in claim 12 wherein said equational error output potentials comprise alternating potentials of a pre-determined frequency having cosine components and sine components, and wherein said current-producing step includes generating an enabling voltage having substantially rectangular narrow wave form of double said frequency said narrow rectangular waves defining said successive time intervals as coincident with the phase periods of said equational error potentials wherein said cosine components are substantially at maximum and said sine components substantially at zero.

15. The method claimed in claim 12 including the final step of dividing each of said established relative digital values of said equational variables by said established relative digital value of said gage variable.

16. In a device of the character described having parallel circuits adapted to produce a plurality of parallel proportional equational potentials, in combination, a pentagrid tube associated with each of said parallel circuits, means connecting said tubes to a source of plate current supply, conductors adapted to apply said proportional equational potentials in signal relation to the first and third grids of said respective tubes, means forming a common conductor of predetermined potential connected to the cathodes of all said tubes, said tubes being biased to virtual cut-off, a common source of screen grid potential connected to the second and fourth grids of said tubes to enable the same, whereby plate output currents may be established proportional to the squares of said proportional equational potentials, a common conductor connected to the plates of all said tubes to establish a single output current including the sum of said individual output currents, a resistor connecting said common output conductor to said common cathode potential conductor, a source of reference potential equal in magnitude to the no-signal voltage drop potential across said resistor, and means to measure the difference between said reference potential and said voltage drop potential when said tubes are actuated in response to said proportional equational potentials.

17. The combination claimed in claim 16 wherein said measuring means comprises a differential cathode follower circuit combination adapted to receive said voltage drop potential and said reference potential in input relation, and a meter adapted to indicate the output differential current of said last-named circuit.

18. The combination claimed in claim 16 wherein said proportional equational potentials are of alternating characteristics of equal frequency including cosine components and sine components, wherein said enabling screen-grid potential source is adapted to produce narrow waves in timed relation to predetermined cyclic periods of said proportional equational potentials, whereby actuation of said tubes may be limited to said cyclic periods wherein said cosine components are substantially at maximum and said sine components substantially at zero, and wherein said reference potential source includes means to limit duration of said reference potential to said periods.

19. The combination claimed in claim 16 wherein said proportional equational potentials are of alternating characteristics whereby the outputs of said tubes may comprise direct current components proportional to the squares of said proportional equational potentials and alternating components, and including means to by-pass said alternating output components around said common resistor to said cathode potential conductor, comprise the sum of said direct current components.

20. In an electrical analog machine for solving simultaneous linear equations having unknown variable factor and known coefficients associated therewith, in combination, means including adjustable voltage dividers and alternating voltage sources associated therewith to establish electrical values representative of trial entries of said variable factors multiplied by said respective coefficients, all said voltage dividers for each equation having a common equational output conductor adapted to receive the algebraic sum of said established electrical values for said respective equation, whereby the potentials of said equational conductors may be proportional to the equational errors due to incorrectness of said trial entries, said equational error potentials being of equal alternating frequency, a plurality of parallel electronic circuit combinations associated respectively with said equational conductors and including tubes controllable in response to said respective equational error potentials and adapted to establish electrical output values proportional to the squares of said respective equational error potentials, a source of intermittent actuating voltage connected to said tubes for actuating the same in phase-sensitive timed relationship to the alternations of said equational error potentials, means to add said last named output values, metering means to produce a quantitative indication proportional to said sum, said first-named voltage sources being successively adjustable to establish final entry potentials representative of solutional values of said variables whereby said indicated sum may be reduced to zero, and digital calibrating means to determine the relative values of said final entry potentials.

21. In a device for solving simultaneous linear equations having unknown quantity factors and known coefficients thereof, in combination, a plurality of alternating current sources at least equal in number to the number of said unknown quantities, each comprising an entry means for values of one of said unknown quantities, said sources being of the same alternating frequency, individual means to vary the output voltages of said sources in proportion to numerical entries of said respective unknowns, a plurality of switching means divided into individual groups for each of said coefficients, the switching groups corresponding to coefficients of each of said unknown factors in all said equations being associated with the output conductors of said corresponding unknown factor current sources, a group of graded fixed resistors associated with each of said switching groups, a common potential output conductor for each of said groups of resistors, said switches being controllable by punch cards to place resistors of each of said groups in circuit between said respective current sources and said common output conductors in selective correspondence to the numerical values of said respective coefficients, whereby potentials may be set up in said potential output conductors proportional to said respective unknown quantity entries modified by said respective coefficients, conducting means to combine said proportional output potentials to form a single alternative potential of said frequency for each of said equations, electronic circuit combinations associated with said equational potential conductors and adapted to intermittently produce currents proportional to the squares of said equational potentials during separate successive time intervals in timed relation to said frequency, means to add said intermittent currents, and means to measure said current sum.

22. In an electrical analog device for solving simultaneous linear equations, in combination, means to establish alternating electrical potentials respectively proportional to the unknown variables of said equation and to a gage variable, a source of alternating reference potential, digitally settable calibrating means to establish trial values of said reference potential in quantitative comparisons respectively with said unknown variable and said gage variable potentials and in phase therewith, and means including a direct current meter cooperative with said establishing means to measure the difference between said respective compared potentials and to indicate which potential in each comparison is the greater.

ROBERT M. WALKER.

REFERENCES CITED

The following references are of record in the file of this patent:

UNITED STATES PATENTS

| Number | Name | Date |
| --- | --- | --- |
| 2,454,549 | Brown | Nov. 23, 1948 |
| 2,455,974 | Brown | Dec. 14, 1948 |
| 2,459,106 | Hardy | Jan. 11, 1949 |
| 2,468,150 | Wilcox | Apr. 26, 1949 |
| 2,469,627 | Bowman | May 10, 1949 |
| 2,469,628 | Bowman | May 10, 1949 |
| 2,476,747 | Lovell | July 19, 1949 |